(12) United States Patent
Kim (10) Patent No.: US 12,172,723 B2
(45) Date of Patent: Dec. 24, 2024

(54) FOUR-WHEEL INDEPENDENT STEERING SYSTEM AND METHOD OF CONTROLLING THE SAME

(71) Applicant: HYUNDAI MOBIS CO., LTD., Seoul (KR)

(72) Inventor: Tae Hong Kim, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 208 days.

(21) Appl. No.: 17/719,593

(22) Filed: Apr. 13, 2022

(65) Prior Publication Data
US 2023/0227102 A1    Jul. 20, 2023

(30) Foreign Application Priority Data
Jan. 14, 2022    (KR) .................. 10-2022-0005762

(51) Int. Cl.
*B62D 7/15*    (2006.01)
*B62D 6/00*    (2006.01)

(52) U.S. Cl.
CPC .............. *B62D 7/159* (2013.01); *B62D 6/003* (2013.01); *B62D 7/1509* (2013.01)

(58) Field of Classification Search
CPC ...... B62D 6/003; B62D 7/1509; B62D 7/159; B60Y 2400/84
See application file for complete search history.

(56) References Cited

U.S. PATENT DOCUMENTS

| | | | | |
|---|---|---|---|---|
| 4,418,780 A | * | 12/1983 | Ito | B62D 7/1581 180/422 |
| 4,441,572 A | * | 4/1984 | Ito | B62D 5/06 180/415 |
| 4,625,822 A | * | 12/1986 | Nakamura | B62D 7/159 180/415 |
| 4,673,189 A | * | 6/1987 | Kanazawa | B62D 7/1572 180/412 |
| 4,703,822 A | * | 11/1987 | Kawamoto | B62D 7/159 180/412 |

(Continued)

FOREIGN PATENT DOCUMENTS

| | | | | |
|---|---|---|---|---|
| DE | 4332040 A1 | * | 3/1994 | ............ B62D 7/159 |
| DE | 4410465 A1 | * | 9/1994 | ............... B62D 6/00 |

(Continued)

OTHER PUBLICATIONS

German Office Action issued on Sep. 1, 2022, in counterpart German Patent Application No. 10 2022 106 530.8 (5 pages in German).

(Continued)

*Primary Examiner* — John M Zaleskas
(74) *Attorney, Agent, or Firm* — NSIP Law (57) ABSTRACT

A four-wheel independent steering system and a method of controlling the four-wheel independent steering system. The four-wheel independent steering system includes a front/rear-wheel-angle-ratio calculation unit to calculate a ratio Kss between front and rear wheel angles that allows a body slip angle to converge to '0' and allows a yaw angle and a yaw rate to maintain target values, and a control unit to perform four-wheel steering control based on the ratio Kss between the front and rear wheel angles.

10 Claims, 5 Drawing Sheets

(56) References Cited

U.S. PATENT DOCUMENTS

| | | | | |
|---|---|---|---|---|
| 4,706,976 A * | 11/1987 | Kawamoto | ......... | B62D 7/1545 180/409 |
| 4,730,839 A * | 3/1988 | Miyoshi | ......... | B62D 7/159 180/415 |
| 4,767,588 A * | 8/1988 | Ito | ......... | B62D 7/159 701/41 |
| 4,865,146 A * | 9/1989 | Ohe | ......... | B62D 7/159 180/413 |
| 4,902,028 A * | 2/1990 | Serizawa | ......... | B62D 7/1527 180/409 |
| 4,947,326 A * | 8/1990 | Mori | ......... | B62D 7/159 701/42 |
| 4,998,201 A * | 3/1991 | Mori | ......... | B62D 7/1572 701/42 |
| 5,019,982 A * | 5/1991 | Furukawa | ......... | B62D 7/159 701/41 |
| 5,105,899 A * | 4/1992 | Mori | ......... | B62D 7/159 701/41 |
| 5,348,111 A * | 9/1994 | Williams | ......... | B62D 6/00 701/41 |
| 5,365,440 A * | 11/1994 | Abe | ......... | B62D 7/159 180/408 |
| 5,369,580 A * | 11/1994 | Monji | ......... | B62D 7/159 701/1 |
| 5,615,117 A * | 3/1997 | Serizawa | ......... | B62D 6/04 180/413 |
| 5,627,754 A * | 5/1997 | Asanuma | ......... | B62D 7/159 180/408 |
| 5,754,966 A * | 5/1998 | Ichikawa | ......... | B62D 7/159 701/41 |
| 5,762,157 A * | 6/1998 | Uehara | ......... | B62D 6/04 180/197 |
| 5,899,952 A * | 5/1999 | Fukada | ......... | B60W 40/103 303/146 |
| 6,334,656 B1 * | 1/2002 | Furukawa | ......... | B60T 8/1755 303/146 |
| 6,345,218 B1 * | 2/2002 | Yamanaka | ......... | B62D 7/159 701/41 |
| 10,421,487 B2 | 9/2019 | Kim et al. | | |
| 2002/0035425 A1 * | 3/2002 | Deguchi | ......... | B62D 7/159 180/443 |
| 2003/0060959 A1 * | 3/2003 | Lin | ......... | B60T 8/1755 701/70 |
| 2003/0078711 A1 * | 4/2003 | Klein | ......... | B62D 7/159 701/41 |
| 2004/0102886 A1 * | 5/2004 | Lin | ......... | B62D 6/04 701/1 |
| 2005/0234621 A1 * | 10/2005 | Lin | ......... | B62D 7/159 180/408 |
| 2008/0021614 A1 * | 1/2008 | Endo | ......... | B62D 6/008 701/41 |
| 2008/0119988 A1 * | 5/2008 | Yasui | ......... | B62D 7/159 701/41 |
| 2008/0249686 A1 * | 10/2008 | Mikuriya | ......... | B62D 6/002 701/42 |
| 2012/0053756 A1 * | 3/2012 | Han | ......... | G01S 17/875 701/1 |
| 2013/0261898 A1 * | 10/2013 | Fujita | ......... | B62D 7/159 701/42 |
| 2014/0229072 A1 * | 8/2014 | Kang | ......... | B62D 7/159 701/42 |
| 2017/0144653 A1 * | 5/2017 | Liu | ......... | B60W 10/20 |
| 2018/0251151 A1 * | 9/2018 | Kimura | ......... | B60W 40/114 |
| 2018/0297634 A1 * | 10/2018 | Kim | ......... | B62D 7/159 |
| 2019/0367075 A1 * | 12/2019 | Kodera | ......... | B62D 5/003 |
| 2022/0073133 A1 * | 3/2022 | Sakayori | ......... | B62D 7/1509 |
| 2023/0182811 A1 * | 6/2023 | Kim | ......... | B62D 7/1545 701/41 |
| 2023/0202557 A1 * | 6/2023 | Yoo | ......... | B62D 7/1509 701/41 |
| 2023/0211772 A1 * | 7/2023 | Suh | ......... | B60N 2/002 701/41 |

FOREIGN PATENT DOCUMENTS

| | | | |
|---|---|---|---|
| DE | 100 15 682 A1 | 2/2001 | |
| DE | 697 13 208 T2 | 10/2002 | |
| DE | 103 51 908 A1 | 6/2005 | |
| EP | 0588135 A1 * | 3/1994 | |
| JP | 10-965 A | 1/1998 | |
| JP | 2005-204489 A | 7/2005 | |
| JP | 2006103469 A * | 4/2006 | |
| JP | 2008110707 A * | 5/2008 | |
| JP | 2012-525581 A | 10/2012 | |
| KR | 10-2274120 B1 | 7/2021 | |

OTHER PUBLICATIONS

Korean Office Action issued on Dec. 1, 2023, in counterpart Korean Patent Application No. 10-2022-0005762 (6 pages in Korean).

* cited by examiner

FOUR-WHEEL INDEPENDENT STEERING SYSTEM AND METHOD OF CONTROLLING THE SAME

CROSS-REFERENCE TO RELATED APPLICATION

This application claims priority from and the benefit of Korean Patent Application No. 10-2022-0005762, filed on Jan. 14, 2022, which is hereby incorporated by reference for all purposes as if set forth herein.

BACKGROUND

Field

Exemplary embodiments of the present disclosure relate to a four-wheel independent steering system and a method of controlling the same, and more particularly, to a four-wheel independent steering system and a method of controlling the same, which are capable of allowing a driver to feel dynamic steering by instantaneously adjusting a turning radius while following a target yaw rate at the time of four-wheel independent steering control of controlling a steering angle of a rear wheel depending on a steering angle of a front wheel.

Discussion of the Background

Recently, researches are being conducted on an in-wheel motor system in which motors are respectively embedded in four wheels of a vehicle and independently operate the four wheels.

The in-wheel motor system may be organically coupled to the vehicle to implement a four-wheel independent driving and four-wheel independent steering system, thereby providing more flexible and various traveling performance.

A general vehicle changes a traveling direction thereof by steering only front wheels. For this reason, the traveling direction of the vehicle does not coincide with a viewing direction of a driver because the front and rear wheels are different in point in time at which a lateral force is generated. However, the four-wheel independent steering system is also applied to the rear wheels, thereby reducing a rotation radius of the vehicle while the driver parks the vehicle or turns the vehicle at low velocity and improving traveling stability when the driver changes the direction of the vehicle while driving the vehicle at high velocity.

In this case, in the related art, to determine gear ratios of the front and rear wheels in order to control the four-wheel independent steering system, the gear ratios of the front and rear wheels are set on the assumption that a yaw rate value and a side slip angle (body slip angle) value converge to zero.

Therefore, the four-wheel independent steering control advantageously implements original dynamic steering performance and reduces a turning radius in comparison with two-wheel steering control in the related art. However, since the value of the yaw rate (yaw rate=vehicle velocity/turning radius) converges to zero as described above, the turning radius cannot be reduced theoretically. That is, when the yaw rate is zero, the turning radius inevitably increases, which causes a problem in that it is difficult to exhibit the advantage of the original four-wheel independent steering. In a case in which the gear ratios of the front and rear wheels are set to fixed target values to implement dynamic steering performance, there is a problem in that performance of the four-wheel independent steering control is rather restricted.

Accordingly, there is a need for a four-wheel independent steering control method capable of allowing a driver to feel dynamic steering by instantaneously adjusting the turning radius while following the target yaw rate at the time of controlling four-wheel independent steering.

The background technology of the present disclosure is disclosed in Korean Patent No. 10-2274120 (registered on Jul. 1, 2021 and entitled 'APPARATUS AND METHOD FOR CONTROLLING REAR WHEEL STEERING SYSTEM').

SUMMARY OF THE INVENTION

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

Various embodiments are directed to a provide a four-wheel independent steering system and a method of controlling the same, which are capable of allowing a driver to feel dynamic steering by instantaneously adjusting a turning radius while following a target yaw rate at the time of four-wheel independent steering control of controlling a steering angle of a rear wheel depending on a steering angle of a front wheel.

Technical problems to be solved by the present invention are not limited to the above-mentioned technical problem(s), and other technical problem(s), which are not mentioned above, may be clearly understood by those skilled in the art from the following descriptions.

A four-wheel independent steering system according to an embodiment of the present disclosure includes: a front/rear-wheel-angle-ratio calculation unit configured to calculate a ratio Kss between front and rear wheel angles that allows a body slip angle to converge to '0' and allows a yaw angle and a yaw rate to maintain target values; and a control unit configured to perform four-wheel steering control based on the ratio Kss between the front and rear wheel angles.

In the present disclosure, the front/rear-wheel-angle-ratio calculation unit may control and vary the ratio Kss between the front and rear wheel angles by adjusting a target understeer gradient Kus by adjusting a gain G.

In the present disclosure, the front/rear-wheel-angle-ratio calculation unit may calculate the gain G based on a lookup table LUT in which gains G corresponding to steering angular velocities and steering angular acceleration are stored.

In the present disclosure, the front/rear-wheel-angle-ratio calculation unit may restrict the ratio Kss between the front and rear wheel angles by restricting the yaw rate so that transverse acceleration of the vehicle does not equal or exceed a characteristic value of the vehicle.

In the present disclosure, the characteristic value of the vehicle may be a value based on (a left/right width between tires of the vehicle/(2*a distance from a central axis of the vehicle to a bottom of the vehicle)).

In the present disclosure, in a driver steering mode, the control unit may multiply a front wheel angle $\delta_f$ according to the driver steering by the ratio Kss between the front and rear wheel angles to calculate a rear wheel angle $\delta_r$ and perform rear wheel steering control on the basis of the front wheel angle $\delta_f$ and the rear wheel angle $\delta_r$.

In the present disclosure, in an autonomous driving mode, the control unit may calculate an angle $\delta_{cg}'$ of a rotation center of the vehicle by using the ratio Kss between the front and rear wheel angles, calculate a distance Rr between a rotation center and a central axis of a rear wheel by using the angle of the rotation center of the vehicle, calculate a front wheel angle $\delta_f$ and a rear wheel angle $\delta_r$ on the basis of the distance Rr between the rotation center and the central axis of the rear wheel, and perform four-wheel steering control on the basis of the front wheel angle $\delta_f$ and the rear wheel angle $\delta_r$.

Another embodiment of the present disclosure provides a method of controlling a four-wheel independent steering system, the method including: calculating, by a front/rear-wheel-angle-ratio calculation unit, a ratio Kss between front and rear wheel angles that allows a body slip angle to converge to '0' and allows a yaw angle and a yaw rate to maintain target values; and performing, by a control unit, four-wheel steering control on the basis of the ratio Kss between the front and rear wheel angles.

In the present disclosure, in the calculating of the ratio Kss between the front and rear wheel angles, the front/rear-wheel-angle-ratio calculation unit may control and vary the ratio Kss between the front and rear wheel angles by adjusting a target understeer gradient Kus by applying a gain G.

In the present disclosure, in the calculating of the ratio Kss between the front and rear wheel angles, the front/rear-wheel-angle-ratio calculation unit may calculate the gain G based on a lookup table LUT in which gains G corresponding to steering angular velocities and steering angular acceleration are stored.

In the present disclosure, in the calculating of the ratio Kss between the front and rear wheel angles, the front/rear-wheel-angle-ratio calculation unit may restrict the ratio Kss between the front and rear wheel angles by restricting the yaw rate so that transverse acceleration does not equal or exceed a characteristic value of a vehicle.

In the present disclosure, the characteristic value of the vehicle may be a value based on (a left/right width between tires of the vehicle/(2*a distance from a central axis of the vehicle to a bottom of the vehicle)).

In the present disclosure, in the performing of the four-wheel steering control, in a driver steering mode, the control unit may multiply a front wheel angle $\delta_r$ according to the driver steering by the ratio Kss between the front and rear wheel angles to calculate a rear wheel angle $\delta_f$ and perform rear wheel steering control on the basis of the front wheel angle $\delta_r$ and the rear wheel angle $\delta_f$.

In the present disclosure, in the performing of the four-wheel steering control, in an autonomous driving mode, the control unit may calculate an angle $\delta_{cg}'$ of a rotation center of the vehicle by using the ratio Kss between the front and rear wheel angles, calculate a distance Rr between a rotation center and a central axis of a rear wheel by using the angle of the rotation center of the vehicle, calculate a front wheel angle $\delta_f$ and a rear wheel angle $\delta_r$ on the basis of the distance Rr between the rotation center and the central axis of the rear wheel, and perform four-wheel steering control on the basis of the front wheel angle $\delta_f$ and the rear wheel angle $\delta_r$.

According to the four-wheel independent steering system and the method of controlling the same according to the embodiment of the present disclosure, it is possible to allow the driver to feel dynamic steering by instantaneously adjusting the turning radius while following the target yaw rate at the time of the four-wheel independent steering control of controlling the steering angle of the rear wheel depending on the steering angle of the front wheel.

Meanwhile, the effects of the present disclosure are not limited to the above-mentioned effects, and various effects may be included within a range obvious to those skilled in the art from the following description.

Other features and aspects will be apparent from the following detailed description, the drawings, and the claims.

DETAILED DESCRIPTION OF THE ILLUSTRATED EMBODIMENTS

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, a four-wheel independent steering system and a method of controlling the same according to an embodiment of the present disclosure will be described in detail with reference to the accompanying drawings. Here, thicknesses of lines illustrated in the drawings, sizes of constituent elements, or the like may be exaggerated for clarity and convenience of description. In addition, the terms used below are defined in consideration of the functions thereof in the present disclosure and may vary depending on the intention of a user or an operator or a usual practice. Therefore, such terms should be defined based on the entire contents of the present specification.

For example, the configurations described in the present specification may be implemented as methods or processes, devices, software programs, data stream, or signals. Even though the implementation of the single form is described (e.g., only the method is described), the described features may also be in other forms (e.g., devices or programs). The device may be implemented as appropriate hardware, software, firmware, and the like. For example, the method may be implemented by devices such as processors generally referring to processing devices including computers, microprocessors, integrated circuits, programmable logic devices, or the like. The processors also include communication devices such as computers, cellular phones, portable/personal information terminals (personal digital assistants (PDA)), and other devices that facilitates information communication with final users.

Figure 1:
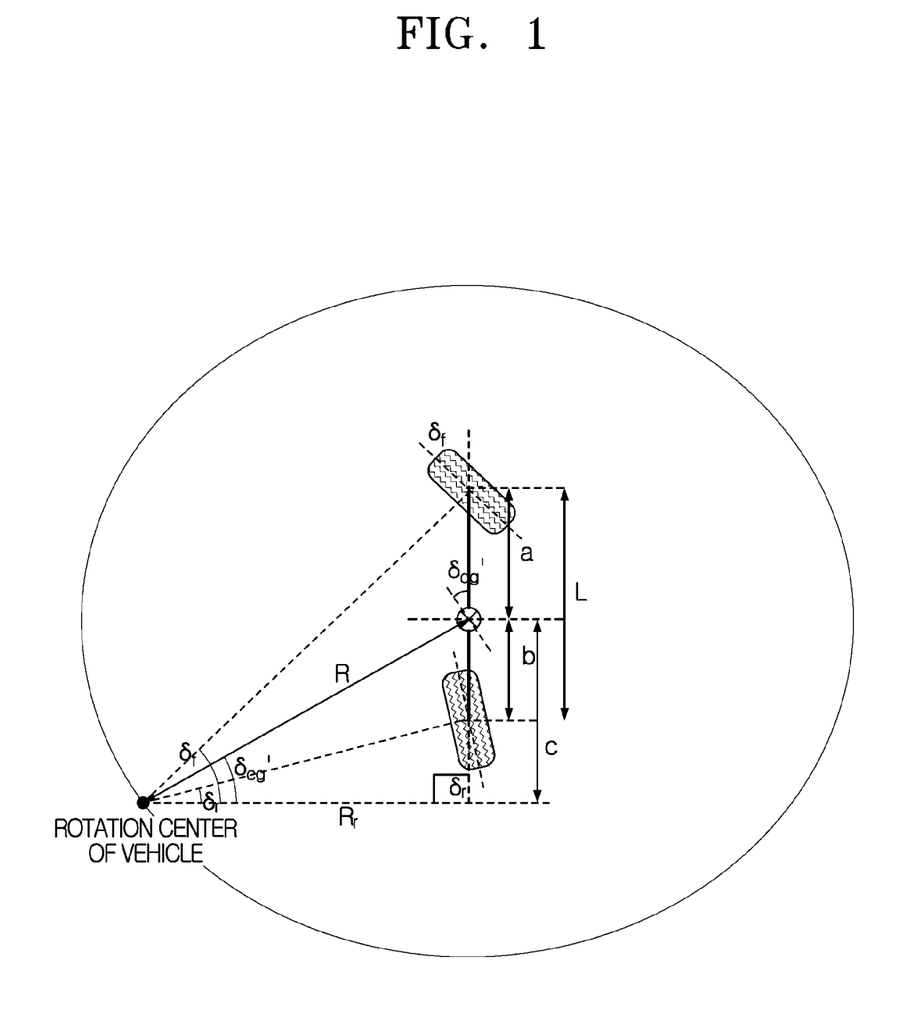
FIG. 1 is an exemplified view illustrating a four-wheel model for explaining the vehicle dynamics.
Figure 2:
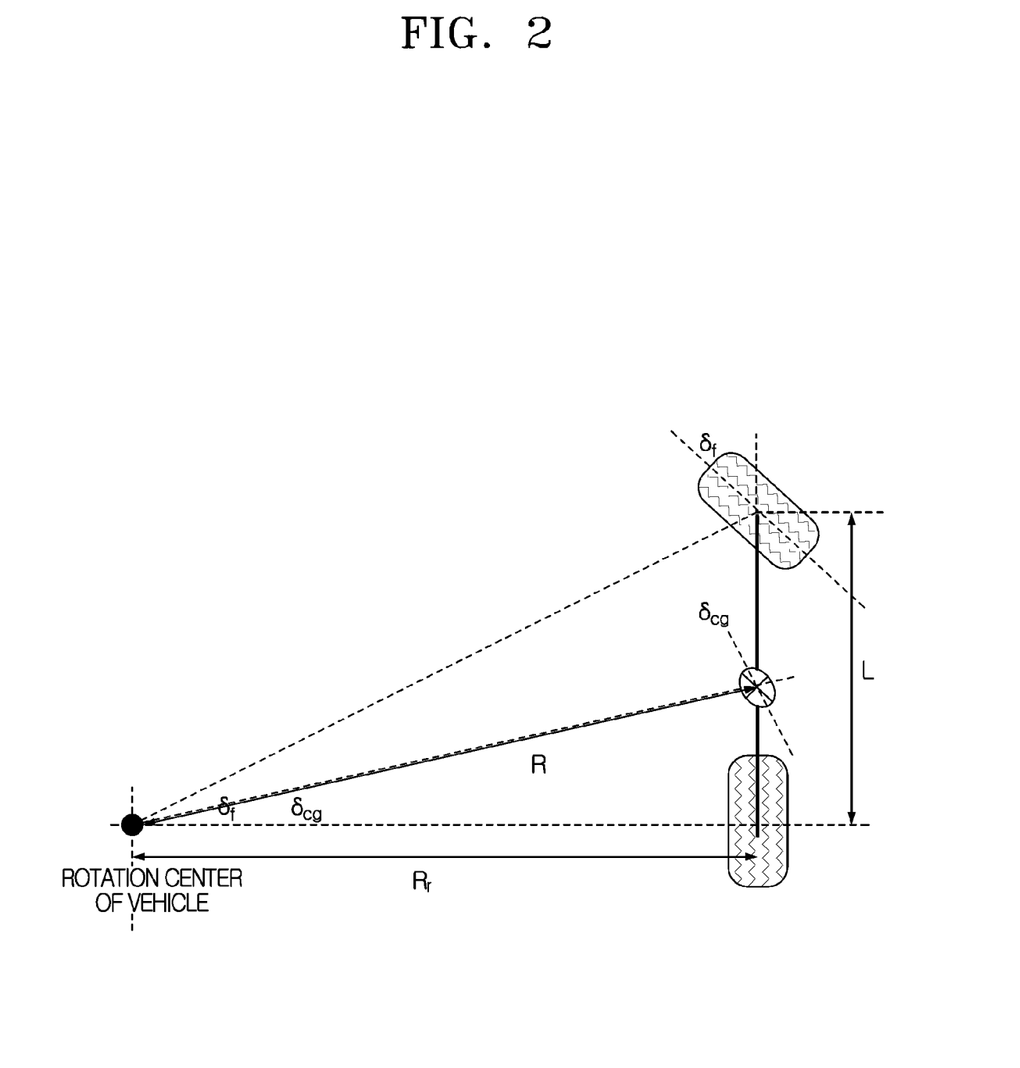
FIG. 2 is an exemplified view illustrating a two-wheel model for explaining the vehicle dynamics.
Figure 3:
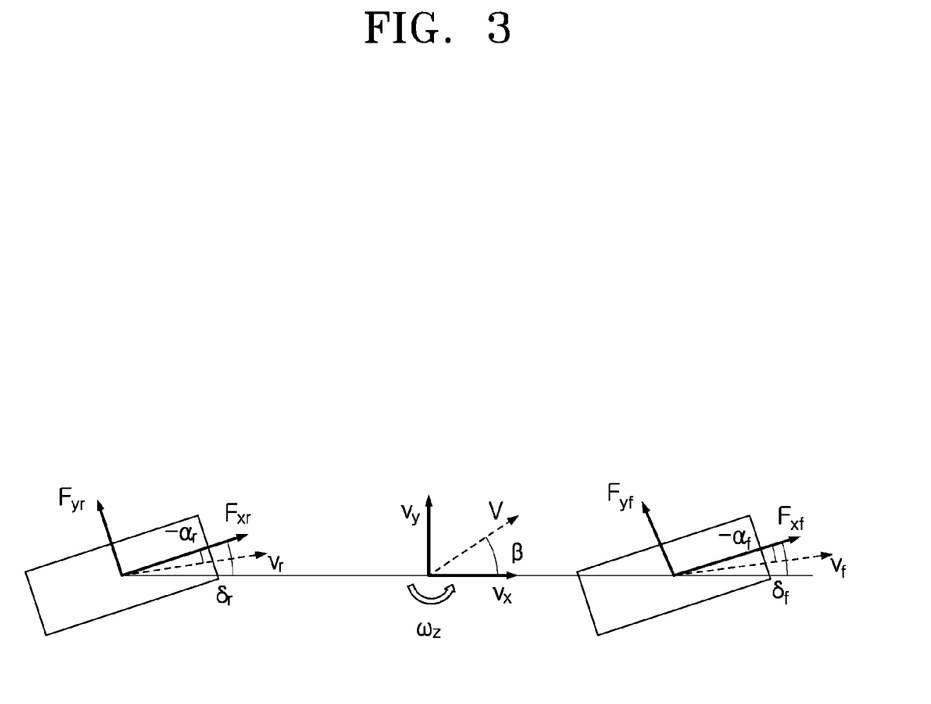
FIG. 3 is an exemplified view illustrating a one-track model for explaining the vehicle dynamics.

FIG. 1 is an exemplified view illustrating a four-wheel model for explaining the vehicle dynamics, FIG. 2 is an exemplified view illustrating a two-wheel model for explaining the vehicle dynamics, and FIG. 3 is an exemplified view illustrating a one-track model for explaining the vehicle dynamics.

The vehicle dynamics on the four-wheel model will be described with reference to FIG. 1. In general, in an autonomous driving mode, an autonomous driving module (not illustrated) applies a value of a turning radius R, a steering angle of a front wheel, or a central angle of a vehicle to a four-wheel independent steering system. If the autonomous driving module applies only the steering angle of the front wheel, the value of the turning radius R and an angle δcg' of a rotation center of the vehicle need to be obtained by using dynamics.

First, a vehicle model analyzer (not illustrated) may obtain c and a distances Rr between a central axis of a rear wheel and the rotation center by applying the turning radius R and the angle δcg' of the rotation center of the vehicle by using Equation 1 below.

$$R_r = R \times \cos \delta_{cg}', c = R \times \sin \delta_{cg}' \quad \text{[Equation 1]}$$

Then, the vehicle model analyzer may calculate a front wheel angle $\delta_f$ and a rear wheel angle $\delta_r$ by using Equation 2 below on the basis of vehicle parameters, c, and the distance Rr between the rotation center and the central axis of the rear wheel.

$$\delta_f = \tan\left(\frac{a+c}{R_r}\right)^{-1}, \delta_r = \tan\left(\frac{c-b}{R_r}\right)^{-1} \quad \text{[Equation 2]}$$

Then, the vehicle model analyzer may calculate each angle of the four wheels, i.e., the front and rear wheels by using Equation 3 below.

$$\delta_{fi} = \tan\left(\frac{a+c}{R_r - \frac{W}{2}}\right)^{-1}, \delta_{fo} = \tan\left(\frac{a+c}{R_r + \frac{W}{2}}\right)^{-1}$$
$$\delta_{ri} = \tan\left(\frac{c-b}{R_r - \frac{W}{2}}\right)^{-1}, \delta_{ro} = \tan\left(\frac{c-b}{R_r + \frac{W}{2}}\right)^{-1} \quad \text{[Equation 3]}$$

Here, $\delta_{fi}$ may represent a left front wheel angle, $\delta_{fo}$ may represent a right front wheel angle, $\delta_{ri}$ may represent a left rear wheel angle, $\delta_{ro}$ may represent a right rear wheel angle, a may represent a distance between a front wheel axis and a center of gravity, b may represent a distance between a rear wheel axis and the center of gravity, and W may represent a distance (tread) between the left and right wheels.

In addition, dynamics needs to be used to obtain the value of the turning radius R and the angle δcg' of the rotation center of the vehicle. First, a method of obtaining the turning radius R based on the two wheels will be described with reference to FIG. 2. FIG. 2 illustrates a case in which the autonomous driving module calculates the turning radius on the basis of the steering angle of the front wheel and applies the turning radius to the four-wheel independent steering system.

The vehicle model analyzer may receive a steering angle or a vehicle angle made by an autonomous driving system. In this case, the vehicle angle may be the front wheel angle $\delta_f$ or an angle $\delta_{cg}$ of the center of gravity of the vehicle. The vehicle model analyzer may obtain the turning radius R and the distance Rr between the central axis of the rear wheel and the rotation center for each case as expressed by Equation 4 below. The vehicle model analyzer may obtain the turning radius R and the distance Rr in consideration of the two-wheel steering even though the four-wheel steering is actually adopted.

$$R_r = \frac{L}{\tan\delta_f} \text{ or } R_r = \frac{b}{\tan\delta_{cg}}, R = \frac{R_r}{\cos\delta_{cg}} \quad \text{[Equation 4]}$$

In this case, L may represent a total distance between the front and rear wheels, and b may represent a distance from the central axis of the vehicle to the rear wheel.

Next, to obtain an angle $\delta_{cg}'$ of the rotation center of the vehicle, the vehicle model analyzer may check a ratio between the front and rear wheels determined on the basis of a ratio Kss between the front and rear wheel angles. Then, the vehicle model analyzer may check whether the front and rear wheels are in phase or out of phase.

When the front and rear wheels are in phase, the vehicle model analyzer may calculate a front wheel angle $\delta_f$ and a rear wheel angle $\delta_r$ by using Equation 5 below.

$$\delta_f = \tan\left(\frac{a+c}{R_r}\right)^{-1}, \delta_r = \tan\left(\frac{c-b}{R_r}\right)^{-1} \quad \text{[Equation 5]}$$

When the front and rear wheels are out of phase, the vehicle model analyzer may calculate a front wheel angle $\delta_f$ and a rear wheel angle $\delta_r$ by using Equation 6 below.

$$\delta_f = \tan\left(\frac{a+c}{R_r}\right)^{-1}, \delta_r = \tan\left(\frac{b-c}{R_r}\right)^{-1} \quad \text{[Equation 6]}$$

The vehicle model analyzer may calculate the angle $\delta_{cg}'$ of the rotation center of the vehicle by deploying Equation 7 below. While Equation 7 is deployed in phase, the out-of-phase may also be calculated in a similar way.

[Equation 7]

$$K_{ss} = \frac{\delta_r}{\delta_f} = \frac{\tan\left(\frac{c-b}{R_r}\right)^{-1}}{\tan\left(\frac{a+c}{R_r}\right)^{-1}} = \text{Error of 0.05 rad at 30 degrees or less (time (t))}$$

$$\frac{\frac{c-b}{R_r}}{\frac{a+c}{R_r}} = \frac{c-b}{a+c}, c = \frac{b+aK_{ss}}{1-K_{ss}} \quad \delta_{cg}' = \sin\left(\frac{b+aK_{ss}}{g(1-K_{ss})}\right)^{-1} \quad c = R \times \sin\delta_{cg}'$$

The key of the present disclosure is to obtain the ratio Kss between the front and rear wheel angles. According to dynamics illustrated in FIG. 3, the vehicle model analyzer may define the amount of change in body slip angle (the amount of change in side slip angle $\dot{\beta}$) as expressed by Equation 8 below and define a yaw rate $\dot{\omega}_z$ as expressed by Equation 9 below.

$$\dot{\beta} = -\left(\frac{C_f + C_r}{mV}\right)\beta + \left(\frac{C_r l_r - C_f l_f}{mV^2} - 1\right)\omega_x + \frac{C_f}{mV}\delta_f + \frac{C_r}{mV}\delta_r \quad \text{[Equation 8]}$$

$$\dot{\omega}_x = \left(\frac{C_r l_r - C_f l_f}{I}\right)\beta - \left(\frac{C_f l_f^2 + C_r l_r^2}{IV}\right)\omega_s + \frac{C_f l_f}{I}\delta_f - \frac{C_r l_r}{I}\delta_r \quad \text{[Equation 9]}$$

Equations 10 and 11 below may be made by organizing Equations 8 and 9.

$$\dot{\beta} = a\beta = b\omega_z = c\delta_f = d\delta_r \quad \text{[Equation 10]}$$

$$\dot{\omega}_z = e\beta + f\omega_z + g\delta_f + h\delta_r \quad \text{[Equation 11]}$$

Here, β represents the body slip angle (side slip angle), and $w_z$ represents a yaw angle, $$a = -\left(\frac{C_f + C_r}{mV}\right), b = \left(\frac{C_r l_r - C_f l_f}{mV^2} - 1\right), c = \frac{C_f}{mV}, d = \frac{C_r}{mV},$$

$$e = \frac{C_r l_r - C_f l_f}{IV}, f = -\left(\frac{C_f l_f^2 + C_r l_r^2}{IV}\right), g = \frac{C_f l_f}{I}, \text{ and } h = -\frac{C_r l_r}{I}.$$

The meanings of these variables are defined according to the vehicle dynamics.

Meanwhile, in the related art, a ratio Kss between front and rear wheel angles is derived in a state in which all the body slip angle β, the yaw angle $w_z$, and the yaw rate $\dot{\omega}_z$ converge to '0'. However, in consideration of the dynamics theory such as the yaw rate (yaw rate=vehicle velocity/turning radius), the vehicle does not move in a heading direction of the vehicle and the turning radius cannot be controlled properly, which causes significant heterogeneity to a driver or an occupant and makes it difficult to smoothly follow a target turning radius.

Therefore, there is a need for a technology capable of allowing a driver to feel dynamic steering by instantaneously adjusting the turning radius while following the target yaw rate at the time of the four-wheel independent steering control of controlling the steering angle of the rear wheel on the basis of the steering angle of the front wheel.

Figure 4:
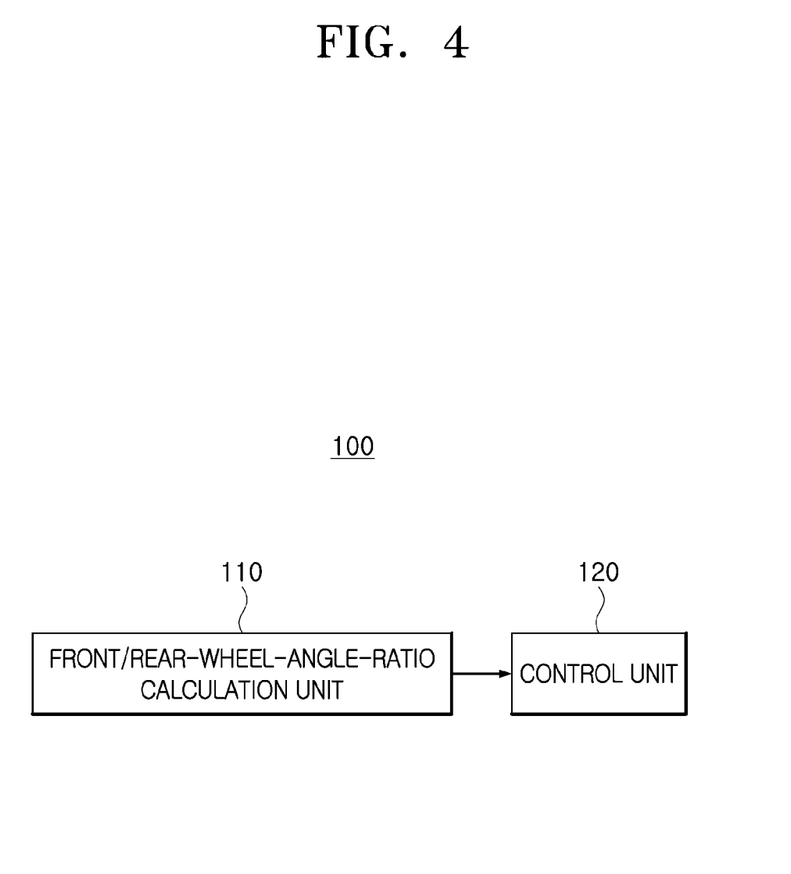
FIG. 4 is an exemplified view illustrating a schematic configuration of a four-wheel independent steering system according to an embodiment of the present disclosure.

FIG. 4 is an exemplified view illustrating a schematic configuration of a four-wheel independent steering system according to an embodiment of the present disclosure.

Referring to FIG. 4, a four-wheel independent steering system 100 according to an embodiment of the present disclosure includes a front/rear-wheel-angle-ratio calculation unit 110 and a control unit 120.

The front/rear-wheel-angle-ratio calculation unit 110 may calculate a ratio Kss between front and rear wheel angles that allows a body slip angle to converge to '0' and allows a yaw angle and a yaw rate to follow target values. That is, the front/rear-wheel-angle-ratio calculation unit 110 enables the four-wheel independent steering system 100 to exhibit higher vehicle control performance by maintaining the yaw angle and the yaw rate at target levels or changing dynamic situations in the state in which the body slip angle converges to '0'.

A front wheel angle $\delta_f$ may be defined as expressed by Equation 12 below by deploying Equations 10 and 11 by setting the body slip angle and the amount of change in body slip angle to '0' and keeping the other values as they are in Equations 10 and 11.

$$\delta_r = \left(\left(\left(1 - \left(\frac{b}{bg - fc}\right) * \left(\frac{V}{L + (Kus * G * V^2)}\right)\right)\right) * \frac{bg - fc}{fd - bh}\right) \star \delta_f \quad \text{[Equation 12]}$$

Here, kus represents an understeer gradient, L represents a total distance between the front and rear wheels, and V represents a vehicle velocity, $$a = -\left(\frac{C_f + C_r}{mV}\right), b = \left(\frac{C_r l_r - C_f l_f}{mV^2} - 1\right), c = \frac{C_f}{mV}, d = \frac{C_r}{mV},$$

$$e = \frac{C_r l_r - C_f l_f}{IV}, f = -\left(\frac{C_f l_f^2 + C_r l_r^2}{IV}\right), g = \frac{C_f l_f}{I}, \text{ and } h = -\frac{C_r l_r}{I}.$$

The meanings of these variables are defined according to the vehicle dynamics. kus may be defined as $$\left(\frac{w_f}{C_{af}} - \frac{w_r}{C_{ar}}\right),$$

$w_f$=M*g*(b/L), $w_f$=M*g*(b/L), Caf may mean cornering rigidity, M may mean a weight of the vehicle, g may mean gravitational acceleration, b may mean a distance from the central axis of the vehicle to the rear wheel, a may mean a distance from the central axis of the vehicle to the front wheel, and L may mean the total distance between the front and rear wheels.

The performance of the four-wheel independent steering system 100 significantly varies depending on how to define the ratio Kss between the front and rear wheel angles. The ratio Kss between the front and rear wheel angles refers to a ratio between a front wheel angle $\delta_f$ and a rear wheel angle $\delta_r$. For example, in a case in which the ratio Kss between the front and rear wheel angles is 1, it indicates that the rear wheel angle is 30 degrees when the front wheel angle is 30 degrees. Therefore, by multiplying a front wheel angle $\delta_f$ by the ratio Kss between the front and rear wheel angles, a target rear wheel angle $\delta_r$ is calculated (i.e., $\delta_f = K_{ss} * \delta_f$).

Therefore, Equation 13 below may be defined by deploying Equation 12 with respect to the ratio Kss between the front and rear wheel angles.

$$Kss = \left(\left(\left(1 - \left(\frac{b}{bg - fc}\right) * \left(\frac{V}{L + (Kus * G * V^2)}\right)\right)\right) * \frac{bg - fc}{fd - bh}\right) \quad \text{[Equation 13]}$$

Referring to Equation 13, the front/rear-wheel-angle-ratio calculation unit 110 may control and vary the ratio Kss between the front and rear wheel angles by adjusting the target understeer gradient Kus by applying a gain G. In this case, the front/rear-wheel-angle-ratio calculation unit 110 may adjust the ratio Kss between the front and rear wheel angles by applying the gain G calculated on the basis of a lookup table LUT in which gains G corresponding to steering angular velocities and steering angular acceleration are stored.

The front/rear-wheel-angle-ratio calculation unit 110 may change a target yaw rate by applying the gain G. That is, the front/rear-wheel-angle-ratio calculation unit 110 may output dynamic performance based on the gain G. Preferentially, with the ratio Kss between the front and rear wheel angles derived by Equation 13, a stable target yaw rate may be basically derived on the basis of optimized properties of the understeer gradient kus of a two-wheel steering system-based vehicle. This is because both a driver and an occupant are generally familiar with the yaw rate behavior of a typical two-wheel vehicle. The yaw rate is a factor capable of representing vehicle characteristics based on vehicle control safe to some extent. Actually, the value of the understeer gradient kus is a characteristic value of the vehicle and typically causes understeer at the time of designing a vehicle. In the event of oversteer, a driver or an occupant may determine that vehicle control is excessively extremely performed because the steering desired by the vehicle is performed under a turning radius level, which may cause a dangerous situation. In other words, the vehicle is controlled to a much larger degree than the driver controls the vehicle, which decreases the turning radius to an undesired turning radius.

Therefore, by adjusting the target understeer gradient Kus by applying the gain G, it is possible to design the ratio Kss between the front and rear wheel angles under a condition in which the driver may safely control the vehicle and the occupant may obtain comfortable ride quality to some extent.

That is, the body slip angle may converge to '0' because the body slip angle is accompanied by rear wheel control. However, the yaw rate may follow a desired target value while maintaining a stable state, and the gain G may be additionally applied thereto. This is to perform dynamic four-wheel control that exceeds a general two-wheel-based target yaw rate. During four-wheel control, front wheel control and rear wheel control are simultaneously performed. In this case, the amount of change in yaw rate may be increased instantaneously, which may result in a great change in turning radius.

The advantage of the four-wheel control is that the turning radius may be instantaneously and greatly increased or decreased by the driver, the occupant, or the autonomous driving module. The four-wheel control may provide various required turning radiuses in various traveling environments such as situations in which the vehicle runs on a circuit, avoids an obstacle, and operates in a parking mode. The ratio Kss between the front and rear wheel angles is not derived by simply fixing the target yaw rate, but may vary in different situations.

That is, the front/rear-wheel-angle-ratio calculation unit 110 may adjust the target understeer gradient Kus by applying the gain G, and in this case, may instantaneously changes characteristics of the vehicle by using a natural gradient or an oversteer gradient. The two gradient values of the natural gradient and the oversteer gradient do not necessarily cause instability at the time of controlling the vehicle. The value of the gain G may vary when it is necessary to instantaneously and extremely reduce the turning radius while the vehicle extremely avoids an obstacle or runs on a circuit or when comfortable ride quality is needed by greatly reducing the yaw value (when there is no need to reduce the turning radius). That is, the dynamic control is enabled.

The value of the gain G may vary depending on the steering angular velocity or the steering angular acceleration. When the steering angular velocity or the steering angular acceleration increases, it is possible to allow the characteristics of the vehicle to instantaneously have natural or oversteer characteristics by decreasing the value of the gain G. When the steering angular velocity or steering angular acceleration decreases, it is possible to implement stable transverse vehicle control by increasing the value of the gain G. The gain G may be assigned in advance in the form of a lookup table LUT while corresponding to the steering angular velocity and the steering angular acceleration. Since the gain G is assigned in the form of a table as described above, it is possible to find out a parameter optimized by tuning. Because the gain depends on the driver's propensity or ride quality desired by the occupant, the gain may be set according to the platform of the vehicle so that the gain has a separately desired value to implement dynamic performance.

As described above, the front/rear-wheel-angle-ratio calculation unit 110 adopts the gain G to output more dynamic performance, thereby outputting the better performance by changing the transverse vehicle control characteristics.

In addition, the front/rear-wheel-angle-ratio calculation unit 110 may restrict the yaw rate so that transverse acceleration of the vehicle does not become equal to or larger than a characteristic value of the vehicle, thereby restricting the ratio Kss between the front and rear wheel angles. In this case, the characteristic value of the vehicle may be a value based on (a left/right width between tires of the vehicle/(2*a distance from the central axis of the vehicle to a bottom of the vehicle)).

Actually, when the yaw rate value of the vehicle is too extreme, the transverse acceleration also increases. The transverse acceleration a may be defined as $$\frac{V^2}{R}.$$

When a condition of (a/g>T/2H) is satisfied, the vehicle may roll over. In this case, V may mean a velocity of the vehicle, g may mean gravitational acceleration, T may mean a left/right width between the tires of the vehicle, and H may mean a distance from the central axis of the vehicle to the bottom of the vehicle.

The ratio Kss between the front and rear wheel angles is set on the basis of the target yaw rate, and thus the yaw rate may be defined as ψ=V/R. The yaw rate is equal to a value made by dividing the transverse acceleration $$\left(a = \frac{V^2}{R}\right)$$

by the value V. Therefore, when the value of the target yaw rate is limited to a level at which rolling over does not occur, it is possible to ensure safety when there occurs a problem at the time of controlling the vehicle. That is, the ratio Kss between the front and rear wheel angles copes with the limit under the above-mentioned condition.

The control unit 120 may perform four-wheel steering control on the basis of the ratio Kss between the front and rear wheel angles.

In a driver steering mode, the control unit 120 may multiply a front wheel angle $\delta_f$ according to driver steering by the ratio Kss between the front and rear wheel angles to calculate a rear wheel angle $\delta_r$ and perform rear wheel steering control on the basis of the front wheel angle $\delta_f$ and the rear wheel angle $\delta_r$.

When the driver turns a steering wheel in a case in which the driver controls the four-wheel independent steering system 100, the control unit 120 may apply the front wheel angle $\delta_f$ according to the driver steering by applying Equation 12, thereby immediately setting the rear wheel angle.

In other words, based on the driver steering, the front wheel angle $\delta_f$ is the steering angle of the driver, and the rear wheel angle $\delta_r$ may be set depending on the ratio Kss between the front and rear wheel angles. Since the driver has a desired heading angle of the vehicle when steering the vehicle, it is important to allow the driver to feel that the vehicle is controlled in a direction desired by the driver.

In addition, in an autonomous driving mode, the control unit 120 may calculate the angle $\delta_{cg}'$ of the rotation center of the vehicle by using the ratio Kss between the front and rear wheel angles, calculate the distance Rr between the rotation center and the central axis of the rear wheel by using the angle of the rotation center of the vehicle, calculate the front wheel angle $\delta_f$ and the rear wheel angle $\delta_r$ on the basis of the distance Rr between the rotation center and the central axis of the rear wheel, and perform four-wheel steering control on the basis of the front wheel angle $\delta_f$ and the rear wheel angle $\delta_r$.

In the case of the autonomous driving, the turning radius of the vehicle and the ride quality of the occupant are important. Therefore, the control unit 120 may obtain the angle of the rotation center of the vehicle by using $$\delta'_{cg} = \sin\left(\frac{b + aK_{ss}}{R(1 - K_{ss})}\right)^{-1}$$

as expressed in Equation 7 and calculate the front wheel angle $\delta_f$ and the rear wheel angle $\delta_r$ by using Equation 5 or 6. That is, the control unit 120 may derive the front wheel angle $\delta_f$ and the rear wheel angle $\delta_r$ again by using the angle $\delta'_{cg}$ of the rotation center of the vehicle and a desired target value of the turning radius R.

Meanwhile, the front/rear-wheel-angle-ratio calculation unit 110 and the control unit 120 may be respectively implemented by processors installed on a computing device and required to execute programs. As described above, the front/rear-wheel-angle-ratio calculation unit 110 and the control unit 120 may be implemented by the respective components physically and independently provided or implemented to be divided in a single processor depending on functionality.

Figure 5:
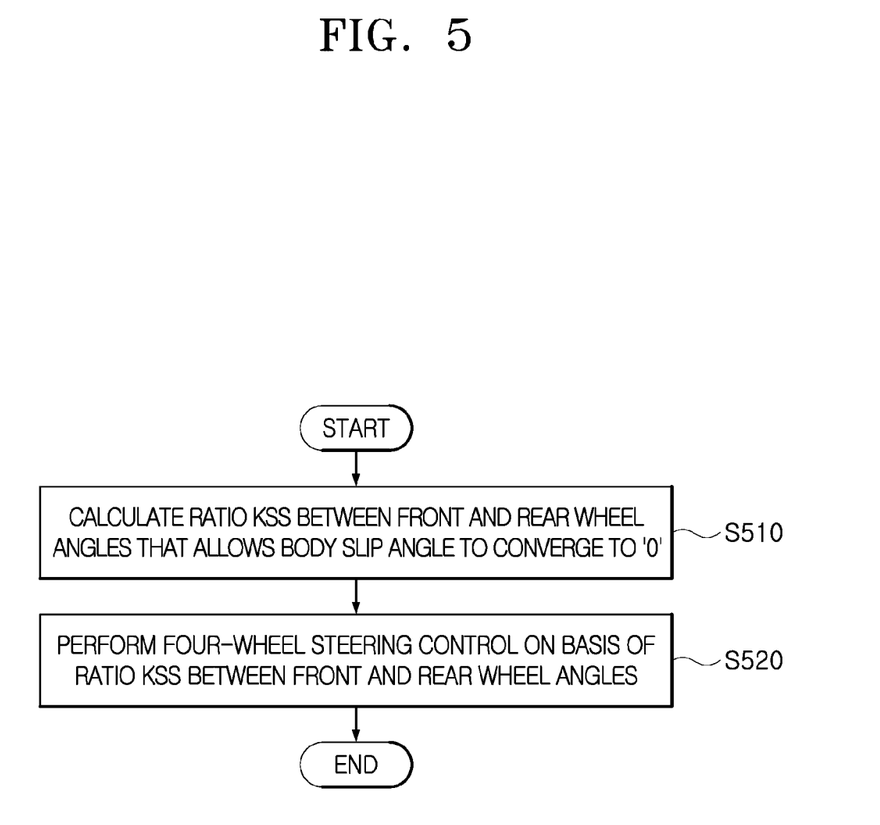
FIG. 5 is a flowchart for explaining a method of controlling the four-wheel independent steering system according to the embodiment of the present disclosure.

FIG. 5 is a flowchart for explaining a method of controlling the four-wheel independent steering system according to the embodiment of the present disclosure.

Referring to FIG. 5, the front/rear-wheel-angle-ratio calculation unit 110 calculates the ratio Kss between the front and rear wheel angles that allows the body slip angle to converge to '0' and allows the yaw angle and the yaw rate to follow the target values (S510). In this case, the front/rear-wheel-angle-ratio calculation unit 110 may control and vary the ratio Kss between the front and rear wheel angles by adjusting the target understeer gradient Kus by adjusting the gain G. That is, the front/rear-wheel-angle-ratio calculation unit 110 may change the target yaw rate by applying the gain G. That is, the front/rear-wheel-angle-ratio calculation unit 110 may output dynamic performance depending on the gain G. In this case, the gain G may be stored in the lookup table LUT while corresponding to the steering angular velocity and the steering angular acceleration.

In addition, the front/rear-wheel-angle-ratio calculation unit 110 may restrict the ratio Kss between the front and rear wheel angles by restricting the yaw rate so that transverse acceleration of the vehicle does not become equal to or larger than a characteristic value of the vehicle.

When step S510 is performed, the control unit 120 performs the four-wheel steering control on the basis of the ratio Kss between the front and rear wheel angles (S520). In this case, in the driver steering mode, the control unit 120 may multiply the front wheel angle $\delta_f$ according to the driver steering by the ratio Kss between the front and rear wheel angles to calculate the rear wheel angle $\delta_r$, and perform the rear wheel steering control on the basis of the front wheel angle $\delta_f$ and the rear wheel angle $\delta_r$.

In addition, in the autonomous driving mode, the control unit 120 may calculate the angle $\delta_{cg}'$ of the rotation center of the vehicle by using the ratio Kss between the front and rear wheel angles, calculate the distance Rr between the rotation center and the central axis of the rear wheel by using the angle of the rotation center of the vehicle, calculate the front wheel angle $\delta_f$ and the rear wheel angle $\delta_r$ on the basis of the distance Rr between the rotation center and the central axis of the rear wheel, and perform the four-wheel steering control on the basis of the front wheel angle $\delta_f$ and the rear wheel angle $\delta_r$.

As described above, according to the four-wheel independent steering system and the method of controlling the same according to the embodiment of the present disclosure, it is possible to allow the driver to feel dynamic steering by instantaneously adjusting the turning radius while following the target yaw rate at the time of the four-wheel independent steering control of controlling the steering angle of the rear wheel depending on the steering angle of the front wheel.

While the present disclosure has been described with reference to the embodiment illustrated in the drawings, the embodiment is described just for illustration, and those skilled in the art to the present technology pertains will understand that various modifications of the embodiment and any other embodiment equivalent thereto are available. Accordingly, the true technical protection scope of the present disclosure should be determined by the appended claims.

What is claimed is:

1. A four-wheel independent steering system of a vehicle comprising:
    a front/rear-wheel-angle-ratio calculation unit configured to calculate a ratio Kss between front and rear wheel angles that allows a body slip angle to converge to '0' and allows a yaw angle and a yaw rate to maintain target values; and
    a control unit configured to perform four-wheel steering control on the basis of the ratio Kss between the front and rear wheel angles,
    wherein the front/rear-wheel-angle-ratio calculation unit is configured to control the ratio Kss between the front and rear wheel angles by adjusting a target understeer gradient by applying a gain, and
    wherein in an autonomous driving mode, the control unit is configured to calculate an angle of a rotation center of the vehicle by using the ratio Kss between the front and rear wheel angles, to calculate a distance between the rotation center of the vehicle and a central axis of a rear wheel by using the angle of the rotation center of the vehicle, to calculate a front wheel angle and a rear wheel angle based on the distance between the rotation center of the vehicle and the central axis of the rear wheel, and to perform the four-wheel steering control based on the front wheel angle and the rear wheel angle.

2. The four-wheel independent steering system of claim 1, wherein the front/rear-wheel-angle-ratio calculation unit is configured to calculate the gain based on a lookup table in which gains corresponding to steering angular velocities and steering angular acceleration are stored.

3. The four-wheel independent steering system of claim 1, wherein the front/rear-wheel-angle-ratio calculation unit is configured to restrict the ratio Kss between the front and rear wheel angles by restricting the yaw rate so that transverse acceleration does not equal or exceed a characteristic value of the vehicle.

4. The four-wheel independent steering system of claim 3, wherein the characteristic value of the vehicle is a value based on a ratio of a left/right width between tires of the vehicle to two times a distance from a central axis of the vehicle to a bottom of the vehicle.

5. The four-wheel independent steering system of claim 1, wherein in a driver steering mode, the control unit is configured to multiply the front wheel angle according to a driver steering by the ratio Kss between the front and rear wheel angles to calculate the rear wheel angle and to perform rear wheel steering control based on the front wheel angle and the rear wheel angle.

6. A method of controlling a four-wheel independent steering system of a vehicle, the method comprising:
calculating, by a front/rear-wheel-angle-ratio calculation unit, a ratio Kss between front and rear wheel angles that allows a body slip angle to converge to '0' and allows a yaw angle and a yaw rate to maintain target values; and
performing, by a control unit, four-wheel steering control based on the ratio Kss between the front and rear wheel angles,
wherein in the calculating of the ratio Kss between the front and rear wheel angles, the front/rear-wheel-angle-ratio calculation unit controls and varies the ratio Kss between the front and rear wheel angles by adjusting a target understeer gradient by applying a gain, and
wherein in the performing of the four-wheel steering control, in an autonomous driving mode, the control unit calculates an angle of a rotation center of the vehicle by using the ratio Kss between the front and rear wheel angles, calculates a distance between a rotation center and a central axis of a rear wheel by using the angle of the rotation center of the vehicle, calculates a front wheel angle and a rear wheel angle based on the distance between the rotation center and the central axis of the rear wheel, and performs the four-wheel steering control based on the front wheel angle and the rear wheel angle.

7. The method of claim 6, wherein in the calculating of the ratio Kss between the front and rear wheel angles, the front/rear-wheel-angle-ratio calculation unit calculates the gain based on a lookup table in which gains corresponding to steering angular velocities and steering angular acceleration are stored.

8. The method of claim 6, wherein in the calculating of the ratio Kss between the front and rear wheel angles, the front/rear-wheel-angle-ratio calculation unit restricts the ratio Kss between the front and rear wheel angles by restricting the yaw rate so that transverse acceleration does not equal or exceed a characteristic value of the vehicle.

9. The method of claim 8, wherein the characteristic value of the vehicle is a value based on a ratio of a left/right width between tires of the vehicle to two times a distance from a central axis of the vehicle to a bottom of the vehicle.

10. The method of claim 6, wherein in the performing of the four-wheel steering control, in a driver steering mode, the control unit multiplies the front wheel angle according to a driver steering by the ratio Kss between the front and rear wheel angles to calculate the rear wheel angle and performs rear wheel steering control based on the front wheel angle and the rear wheel angle.

\* \* \* \* \*